UNITED STATES PATENT OFFICE.

JESSIE G. HOPKINS, OF FLINT, MICHIGAN.

COMPOSITION OF MATTER TO BE USED FOR THE PRESERVATION OF MEATS.

1,098,575.  Specification of Letters Patent.  Patented June 2, 1914.

No Drawing.  Application filed May 3, 1913. Serial No. 765,191.

*To all whom it may concern:*

Be it known that I, JESSIE G. HOPKINS, a citizen of the United States, residing at 800 Church street, in the city of Flint, Genesee county, and State of Michigan, have invented a new and useful Composition of Matter to be Used for the Preservation of Meats, of which the following is a specification.

My composition consists of the following ingredients, viz.: paraffin, lard. These ingredients are to be mixed and heated very hot and mingled by agitation.

In using the above-named composition, the meat, especially such as smoked hams, shoulders or sides, should be freed from all exterior impurities and cleaned and prepared in as smooth a state as possible, and dipped in the preparation or composition while it is still very hot; from my experience the best results are obtained in having the composition heated to almost the boiling point.

After the meat is dipped in the composition, and which should be thoroughly immersed, it should be hung up in some suitable place to cool and the composition set, after which the meat so treated may be packed or stored away, some care being observed, however, to not scratch or erase or remove the coating of the composition, and a cool place being recommended.

The better results are obtained with this composition, by using the ingredients above mentioned in about the following proportion, viz.: $\frac{2}{3}$ paraffin to $\frac{1}{3}$ lard.

What I claim is:—

The herein described coating composition for the treatment of meat in the proportion of two parts paraffin and one part lard.

JESSIE G. HOPKINS.

Witnesses:
　MARSHALL W. FRISBIE,
　KATHARINE LEER.